(12) United States Patent
Hazama

(10) Patent No.: US 8,989,423 B2
(45) Date of Patent: Mar. 24, 2015

(54) MICROPHONE BUSH WITH FOLDABLE TONGUE PORTION

(71) Applicant: Canon Kabushiki Kaisha, Tokyo (JP)

(72) Inventor: Hisakazu Hazama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/753,319

(22) Filed: Jan. 29, 2013

(65) Prior Publication Data

US 2013/0202143 A1 Aug. 8, 2013

(30) Foreign Application Priority Data

Feb. 3, 2012 (JP) ................................. 2012-022149

(51) Int. Cl.
- *H04R 9/08* (2006.01)
- *H04R 11/04* (2006.01)
- *H04R 1/04* (2006.01)
- *H04R 1/02* (2006.01)
- *H04R 1/06* (2006.01)
- *H04N 5/225* (2006.01)

(52) U.S. Cl.
CPC .................. *H04R 1/04* (2013.01); *H04R 1/028* (2013.01); *H04R 1/06* (2013.01); *H04N 5/2252* (2013.01)
USPC ........................................... 381/365; 381/368

(58) Field of Classification Search
USPC .......................... 381/355–368, 384, 409–410
See application file for complete search history.

(56) References Cited

U.S. PATENT DOCUMENTS 7,864,243 B2 * 1/2011 Tsutsumi ...................... 348/373

FOREIGN PATENT DOCUMENTS

JP 2007-194708 A 8/2007

\* cited by examiner

*Primary Examiner* — Ahmad F Matar
*Assistant Examiner* — Katherine Faley
(74) *Attorney, Agent, or Firm* — Canon U.S.A., Inc. IP Division

(57) ABSTRACT

A foldable tongue piece portion formed to extend at an end of a microphone bush. An insertion hole in which a lead wire is inserted is formed near the tongue piece portion. By storing a microphone, to which the microphone bush is attached, in a container portion, the tongue piece portion is folded and the lead wire drawn through the insertion hole is pressed.

6 Claims, 11 Drawing Sheets

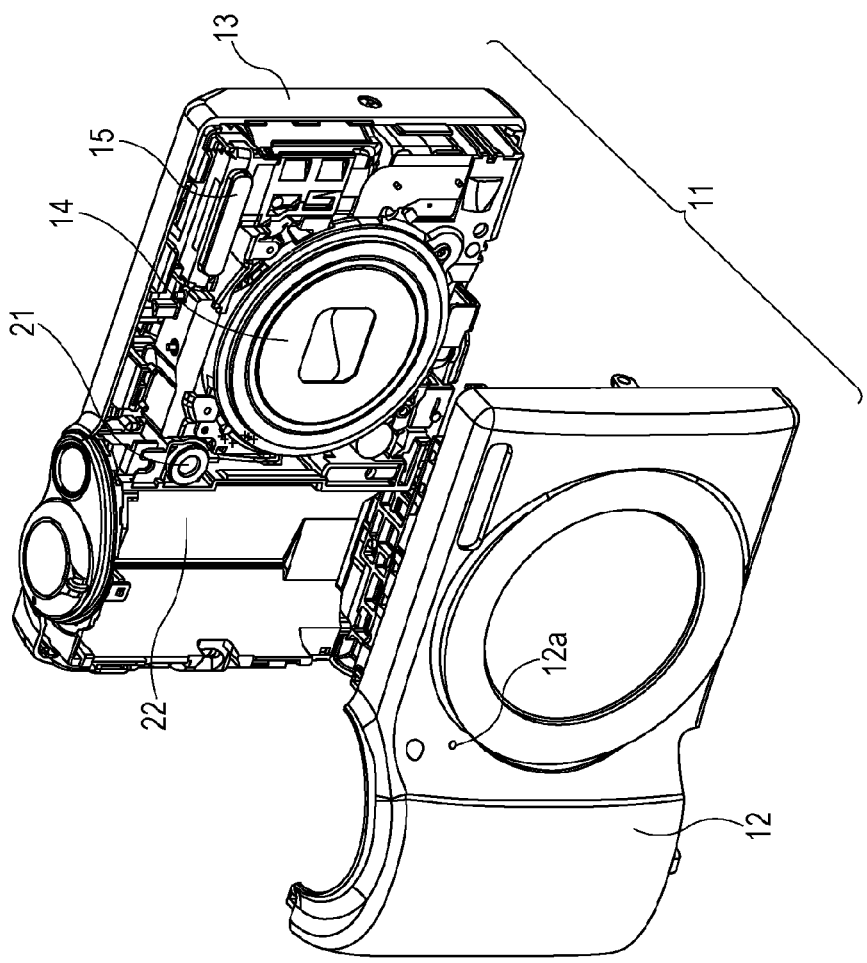
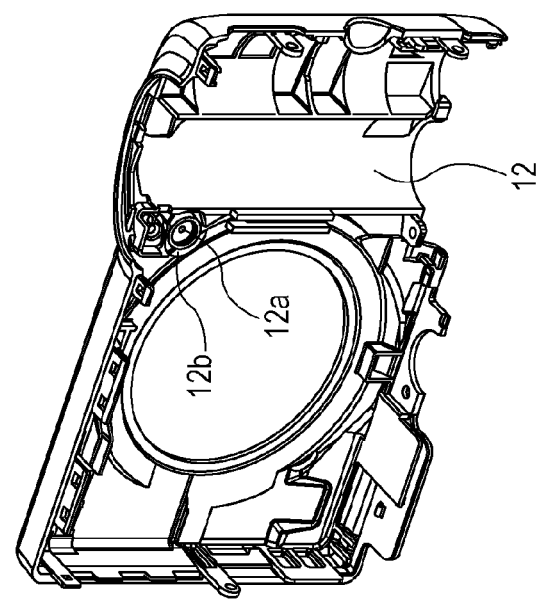

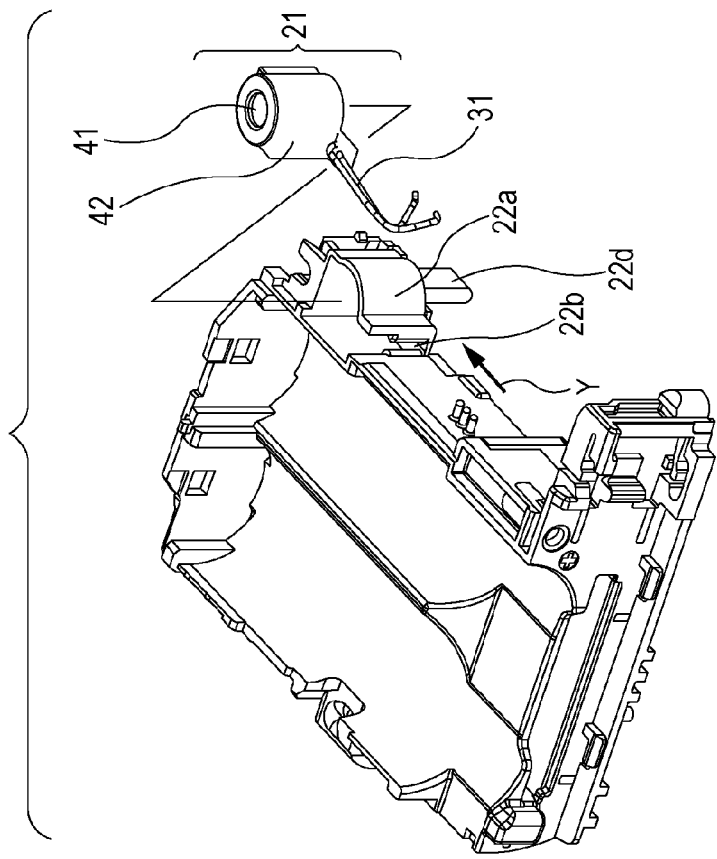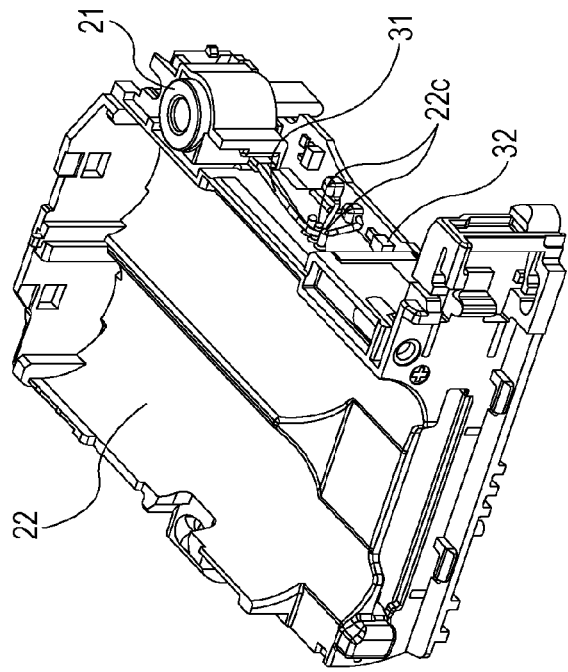

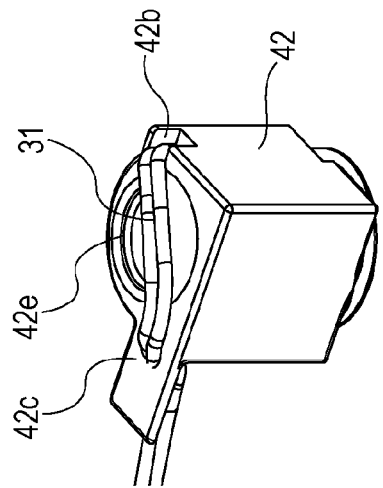
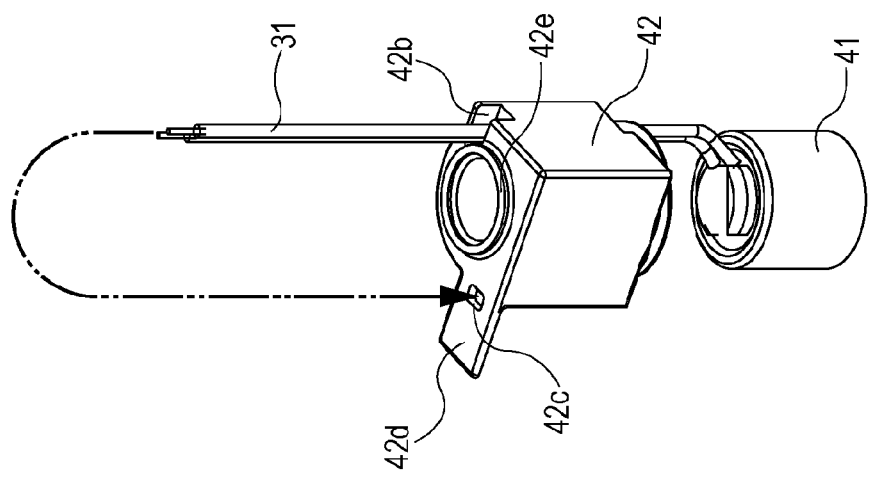
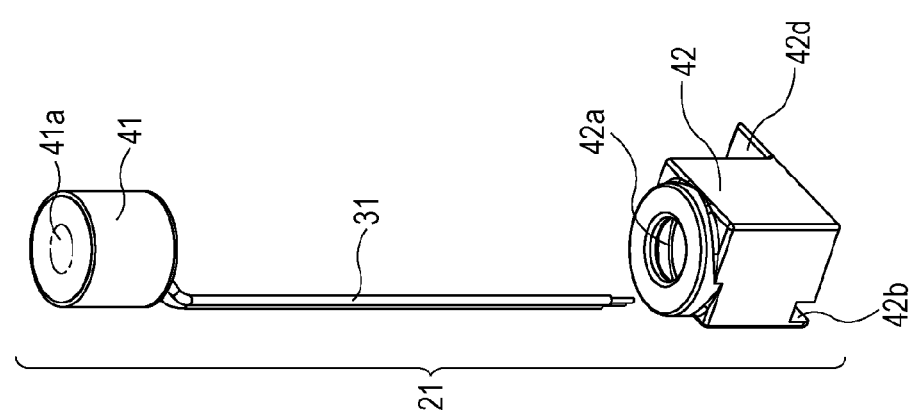

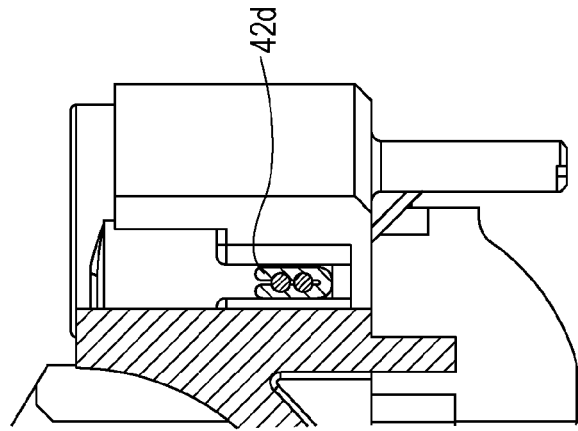
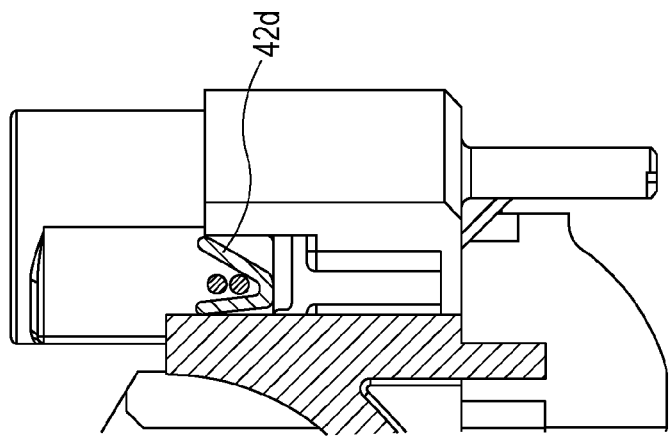
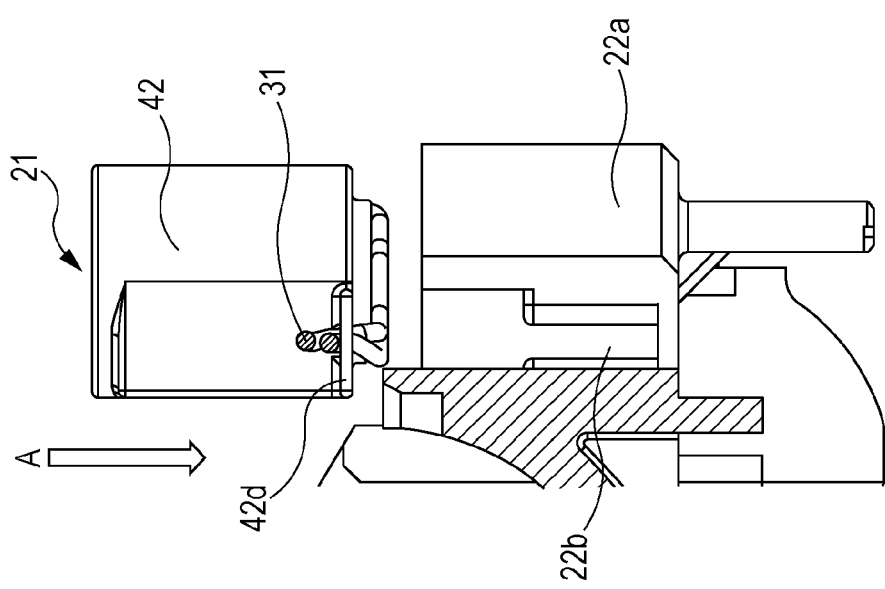

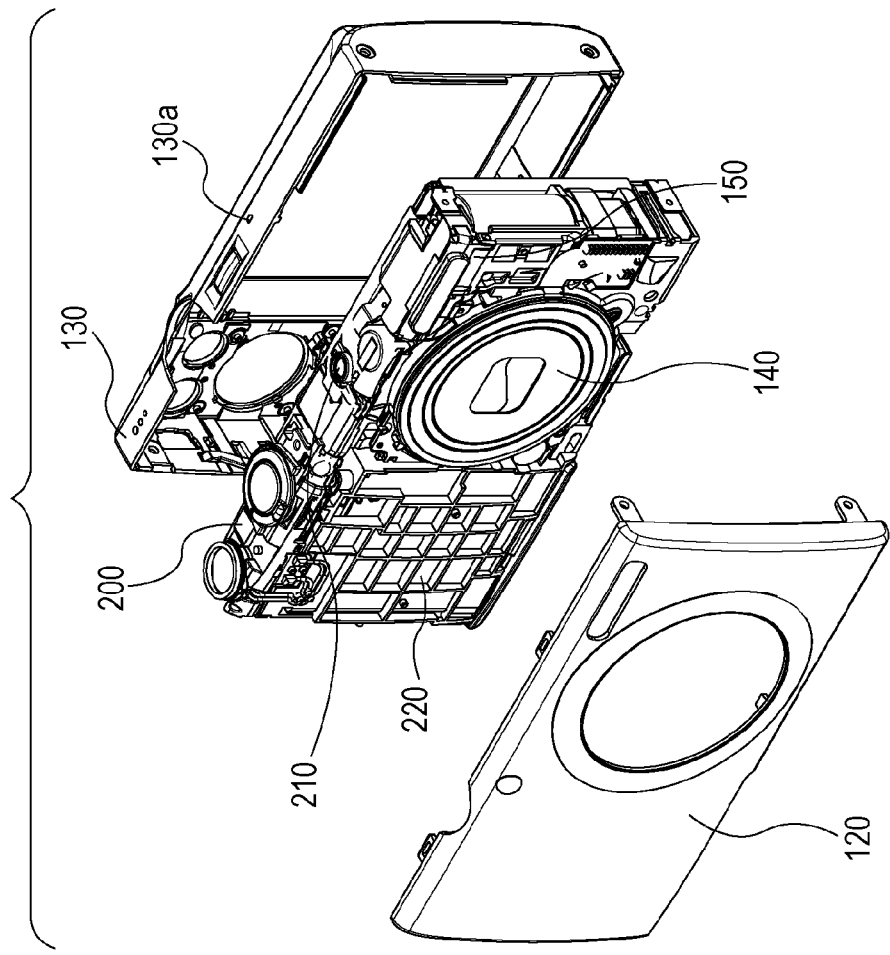
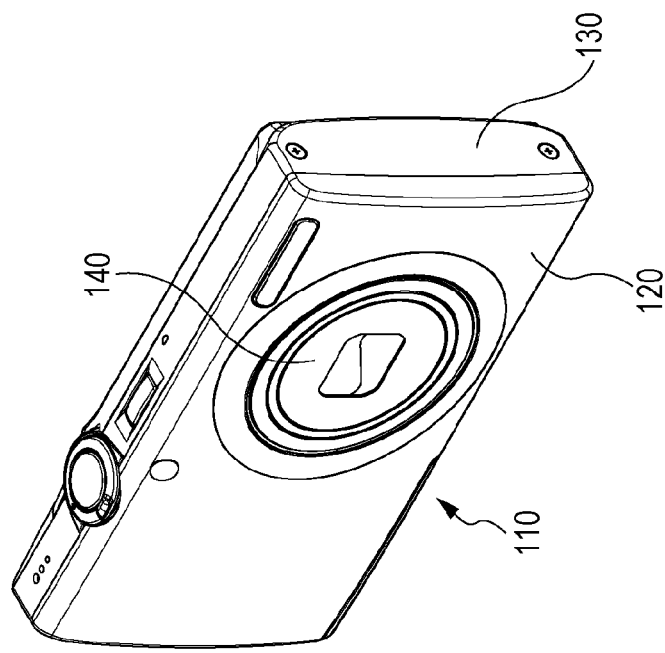

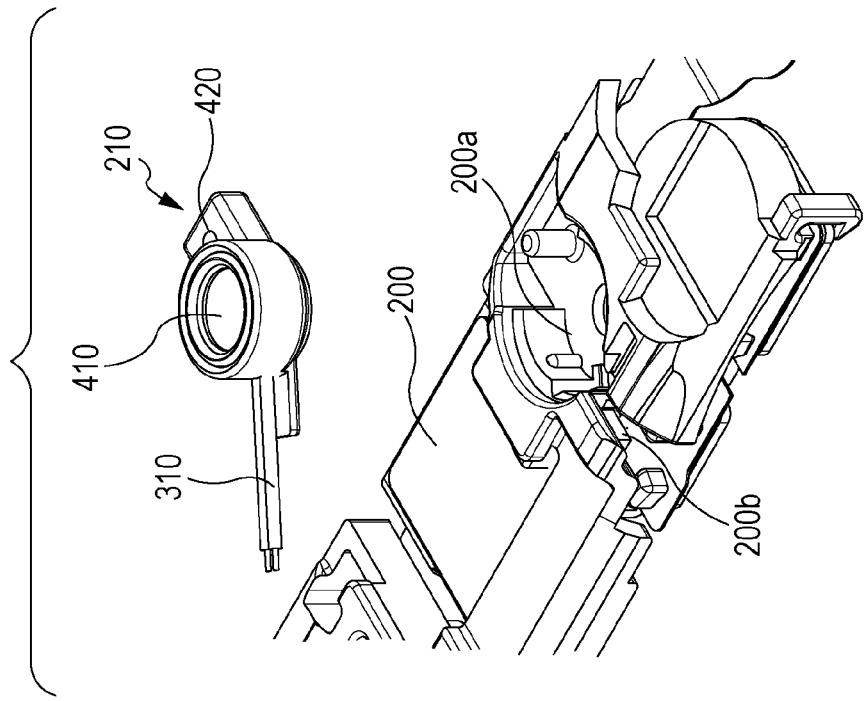
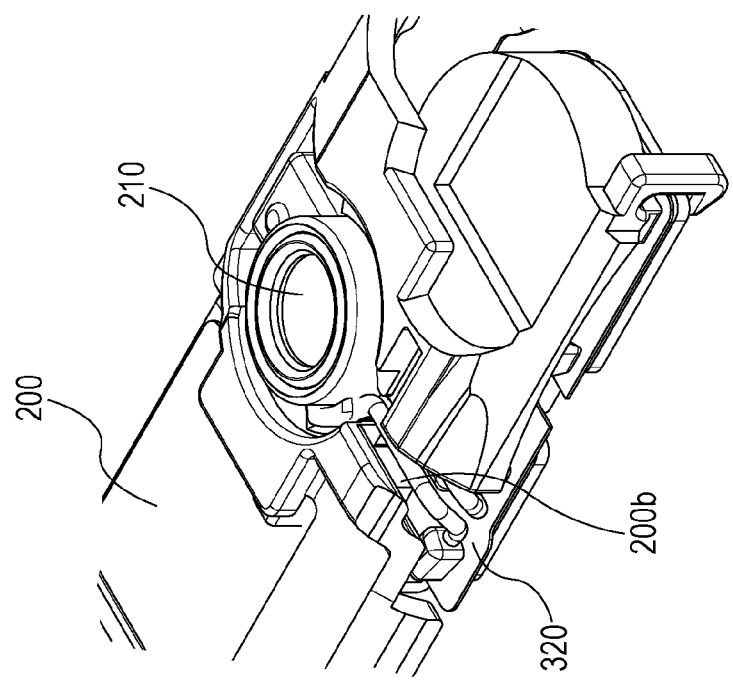

US 8,989,423 B2

MICROPHONE BUSH WITH FOLDABLE TONGUE PORTION

BACKGROUND OF THE INVENTION

1. Field of the Invention

The present invention relates to an electronic device and, more particularly, relates to an electronic device provided with a microphone which includes a lead wire.

2. Description of the Related Art

It has been proposed to reduce noise by covering a microphone with a microphone holder which is made of an elastic material, such as rubber, and disposing the microphone inside an electronic device (See Japanese Patent Laid-Open No. 2007-194708).

Vibration of the lead wire which is connected to the microphone also causes noise. With the technique of the technique disclosed in Japanese Patent Laid-Open No. 2007-194708, vibration of the microphone may be reduced by the microphone holder. However, vibration of the lead wire is not considered in the disclosed technique.

SUMMARY OF THE INVENTION

An aspect of the present invention is an electronic device, which includes: a microphone which includes a lead wire; a microphone bush which is made of an elastic material and is configured to be attached to the microphone; and a main body member which includes a container portion configured to store the microphone to which the microphone bush is attached, wherein a foldable tongue piece portion is formed to extend at an end of the microphone bush, wherein insertion hole in which the lead wire is inserted is formed near the tongue piece portion, wherein the tongue piece portion is folded by storing, in the container portion, the microphone to which the microphone bush is attached, and wherein the lead wire drawn through the insertion hole is pressed by folding the tongue piece portion.

According to the present invention, vibration of a microphone may be reduced in a very small space and, at the same time, vibration of a lead wire connected to the microphone may be reduced without any increase in the number of parts.

Further features of the present invention will become apparent from the following description of exemplary embodiments with reference to the attached drawings.

BRIEF DESCRIPTION OF THE DRAWINGS

FIG. 2A is a perspective view illustrating a state in which a front cover is removed from the digital camera.

FIG. 2B is a perspective view of the removed front cover seen from the inside.

FIG. 3A is an exterior perspective view of a battery box removed from the digital camera.

FIG. 3B is a perspective view illustrating a state in which a microphone unit and a main board are removed from the battery box illustrated in FIG. 3A.

FIGS. 4A to 4C are diagrams illustrating a procedure of assembling the microphone unit.

FIGS. 5A to 5C are diagrams illustrating a state in which the microphone unit assembled in the state of FIG. 4C is being placed in a container portion of the battery box.

FIG. 7A is an exterior perspective view of a digital camera which is an exemplary electronic device to which the present invention is applied.

FIG. 7B is a perspective view illustrating a state in which a front cover and a rear cover are removed from the digital camera.

FIG. 8A is a perspective view illustrating a state in which a microphone unit is being placed in a container portion formed in a top base.

FIG. 8B is a perspective view illustrating a state in which the microphone unit is removed from the top base illustrated in FIG. 8A.

DESCRIPTION OF THE EMBODIMENTS

Hereinafter, preferred embodiments of the present invention will be described in detail with reference to the drawings.

First Embodiment

Figure 1:
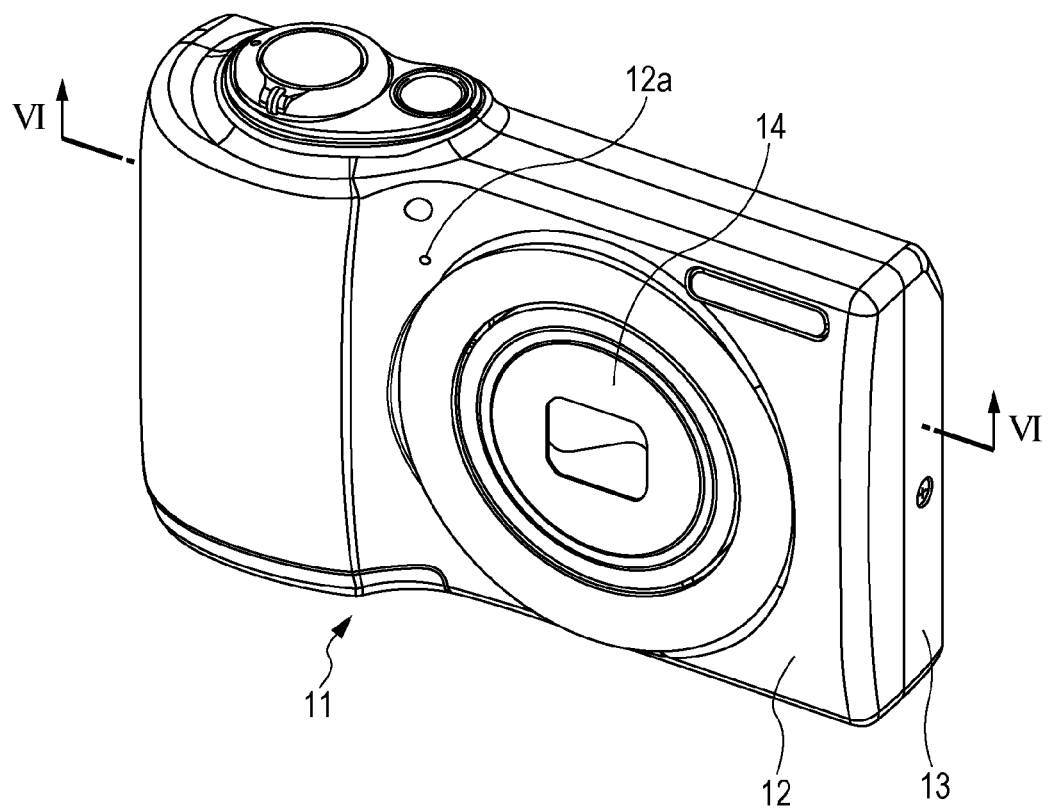
FIG. 1 is an exterior perspective view of a digital camera which is an exemplary electronic device to which the present invention is applied.

FIG. 1 is an exterior perspective view of a digital camera 11 which is an exemplary electronic device to which the present invention is applied.

As illustrated in FIG. 1, a front side of the digital camera 11 is covered with a front cover 12 and a rear side of the digital camera 11 is covered with a rear cover 13. A lens unit 14 is disposed at the front side of the digital camera 11. A microphone hole 12a is formed in the front cover 12. The microphone hole 12a is a through hole formed parallel to an optical axis of the lens unit 14. The microphone hole 12a is formed at a position close to the lens unit 14.

FIG. 2A is a perspective view illustrating a state in which the front cover 12 is removed from the digital camera 11. FIG. 2B is a perspective view of the removed front cover 12 seen from the inside.

As illustrated in FIG. 2A, a lens unit 14, a battery box 22 and a stroboscopic light emission unit 15 are disposed inside the digital camera 11. A battery used as power supply of the digital camera 11 is placed in the battery box 22. A container portion 22a which contains the microphone unit 21 is formed in the battery box 22. The microphone unit 21 is disposed immediately below the microphone hole 12a. The battery box 22 functions as a main body member.

As illustrated in FIG. 2B, a rib-shaped portion 12b which surrounds the microphone hole 12a is formed inside the front cover 12. When the front cover 12 is attached to the digital camera 11, the rib-shaped portion 12b adheres closely to the microphone unit 21 and forms a sound space in front of the microphone unit 21.

FIG. 3A is an exterior perspective view of the battery box 22 removed from the digital camera 11.

As illustrated in FIG. 3A, the container portion 22a, a slit 22b and pins 22c are formed in the battery box 22. The microphone unit 21 is placed in the container portion 22a. When the microphone unit 21 is placed in the container portion 22a, a lead wire 31 passes through an upper portion of the slit 22b and is disposed at a lower portion of the slit 22b. The lead wire 31 is held between the pins 22c and is fixed thereto with an adhesive. The distance between the pins 22c is determined such that the lead wire 31 may be held without being damaged. A main board 32 is attached to a rear side of the battery box 22. The lead wire 31 is soldered to the main board 32.

FIG. 3B is a perspective view illustrating a state in which a microphone unit 21 and a main board 32 are removed from the battery box 22 illustrated in FIG. 3A.

As illustrated in FIG. 3B, the container portion 22a is formed to surround a side surface and a bottom surface of the microphone unit 21. The slit 22b is formed by removing a part of a side surface of the container portion 22a.

The microphone unit 21 includes a microphone element 41, the lead wire 31 and a microphone bush 42. The lead wire 31 is soldered to the microphone element 41 at one end thereof and is soldered to the main board 32 at the other end thereof. The microphone bush 42 is made of an elastic material, such as silicon rubber, and is formed in a shape to be attachable to the microphone element 41 to which one end of the lead wire 31 has been soldered. That is, the microphone unit 21 is a unit in which the lead wire 31 is soldered to the microphone element 41 and the microphone bush 42 is attached to the microphone element 41 to which the lead wire 31 has been soldered.

The microphone unit 21 is placed in the container portion 22a from the front side of the battery box 22 (i.e., a side of a surface which is to be covered with the front cover 12).

FIGS. 4A to 4C are diagrams illustrating a procedure of assembling the microphone unit 21.

FIG. 4A is a diagram illustrating a state in which the lead wire 31 has been soldered to the microphone element 41 and the microphone element 41 has not yet been attached to the microphone bush 42.

As illustrated in FIG. 4A, a sound-collecting portion 41a is formed in the microphone element 41. The microphone bush 42 includes an opening 42a through which the sound-collecting portion 41a is exposed when the microphone bush 42 is attached to the microphone element 41. The microphone bush 42 includes a first insertion hole 42b through which the lead wire 31 is inserted from the inside to the outside of the microphone bush 42 when the microphone bush 42 is attached to the microphone element 41. A tongue piece portion 42d is formed to extend horizontally at an end of the microphone bush 42. The thickness of the tongue piece portion 42d is determined such that the tongue piece portion 42d may be folded into two. Therefore, the tongue piece portion 42d is foldable.

FIG. 4B is a diagram illustrating a state in which the lead wire 31 is placed inside the microphone bush 42 through the opening 42a and is drawn through the first insertion hole 42b.

As illustrated in FIG. 4B, the microphone bush 42 includes a second insertion hole 42c through which the lead wire 31 which has been drawn through the first insertion hole 42b is inserted. The second insertion hole 42c is formed in the tongue piece portion 42d.

The dimension of the second insertion hole 42c is substantially equal to the cross-sectional area of the lead wire 31. If the dimension of the second insertion hole 42c is significantly larger than the cross-sectional area of the lead wire 31, the lead wire 31 moves freely in the second insertion hole 42c. Such a situation is not favorable. On the other hand, if the dimension of the second insertion hole 42c is significantly smaller than the cross-sectional area of the lead wire 31, insertion of the lead wire 31 is difficult.

When the microphone bush 42 is seen from a bottom surface thereof, the first insertion hole 42b and the second insertion hole 42c are formed on a diagonal line. A ring-shaped projection 42e is formed on the bottom surface of the microphone bush 42.

FIG. 4C is a diagram illustrating a state in which the microphone element 41 has been placed inside the microphone bush 42. Since the opening diameter of the opening 42a of the microphone bush 42 is smaller than the outer diameter of the microphone element 41, the opening 42a of the microphone bush 42 is expanded when the microphone element 41 is to be placed inside the microphone bush 42. When the microphone element 41 is attached to the microphone bush 42, the microphone element 41 is covered with the microphone bush 42 except for the sound-collecting portion 41a.

As illustrated in FIG. 4C, the lead wire 31 which has been drawn through the first insertion hole 42b is inserted in the second insertion hole 42c. A section of the lead wire 31 after being drawn through the first insertion hole 42b and before being inserted in the second insertion hole 42c is disposed so as to cross the ring-shaped projection 42e. The microphone unit 21 is placed in the container portion 22a of the battery box 22 in the state illustrated in FIG. 4C.

FIGS. 5A to 5C are diagrams illustrating a state in which the microphone unit 21 assembled in the state of FIG. 4C is being placed in the container portion 22a of the battery box 22. FIGS. 5A to 5C are diagrams illustrating the container portion 22a of the battery box 22 seen from a direction in which the slit 22b is formed (i.e., the arrow Y direction of FIG. 3).

As illustrated in FIG. 5A, when the microphone unit 21 is placed in the container portion 22a of the battery box 22, the orientation of the microphone unit 21 is adjusted such that the lead wire 31 and the tongue piece portion 42d of the microphone bush 42 are situated above the slit 22b. When the microphone unit 21 is moved in the direction of arrow A from the state of FIG. 5A, the state of FIG. 5B is obtained.

As illustrated in FIG. 5B, when the microphone unit 21 begins to be placed in the container portion 22a of the battery box 22, the lead wire 31 and the tongue piece portion 42d of the microphone bush 42 are inserted through an upper portion of the slit 22b. The slit 22b has two different widths. Since the width of the upper portion of the slit 22b is narrower than the width of the tongue piece portion 42d, the tongue piece portion 42d is folded into two such that portions of the tongue piece portion 42d overlap each other as illustrated in FIG. 5B. The width of the upper portion of the slit 22b is greater than the dimension corresponding to twice the thickness of the tongue piece portion 42d to which the outer diameter of the lead wire 31 is added. Therefore, when the lead wire 31 and the tongue piece portion 42d of the microphone bush 42 pass through the slit 22b, although the tongue piece portion 42d is folded into two, the lead wire 31 is not pressed by the tongue piece portion 42d. When the microphone unit 21 is moved in the direction of arrow A from the state of FIG. 5B, the state of FIG. 5C is obtained.

As illustrated in FIG. 5C, the microphone unit 21 is placed in the container portion 22a of the battery box 22, and the lead wire 31 and the tongue piece portion 42d of the microphone bush 42 are inserted through the lower portion of the slit 22b. The width of the lower portion of the slit 22b is smaller than the dimension corresponding to twice the thickness of the tongue piece portion 42d to which the outer diameter of the lead wire 31 is added. Therefore, when the lead wire 31 and the tongue piece portion 42d of the microphone bush 42 are situated at the lower portion of the slit 22b, the tongue piece portion 42d is collapsed and the lead wire 31 is pressed by the tongue piece portion 42d within the slit.

In the state of FIG. 5C, the microphone bush 42 has been press-fit in the container portion 22a of the battery box 22. Therefore, the first insertion hole 42b formed in the microphone bush 42 is closed tightly by the container portion 22a of the battery box 22. With this configuration, entrance of noise and vibration into the microphone bush 42 through the first insertion hole 42b can be reduced.

Further, since the microphone bush 42 is press-fit in the container portion 22a, the microphone bush 42 is collapsed. Therefore, the lead wire 31 drawn through the first insertion hole 42b is disposed between the container portion 22a and the microphone bush 42.

Figure 6:
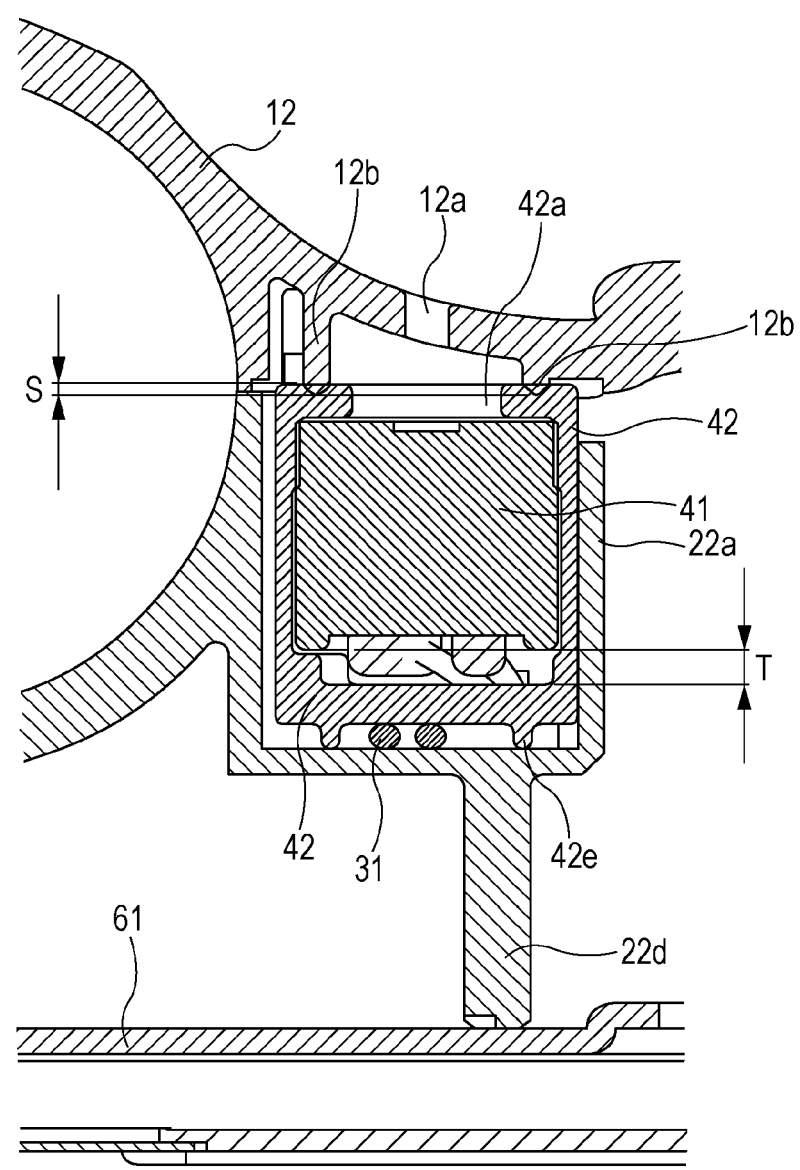
FIG. 6 is an enlarged cross-sectional view of the microphone unit and its vicinity along line VI-VI of FIG. 1.

FIG. 6 is an enlarged cross-sectional view of the microphone unit 21 and its vicinity along line VI-VI of FIG. 1.

As illustrated in FIG. 6, a contact portion 22d at which the container portion 22a contacts a chassis 61 is formed on a rear side of the container portion 22a. When the rib-shaped portion 12b of the front cover 12 is pressed against the microphone bush 42, the contact portion 22d is brought into contact with the chassis 61 and the rib-shaped portion 12b of the front cover 12 causes the microphone bush 42 to collapse by the dimension S. In this manner, the rib-shaped portion 12b adheres closely to the microphone unit 21 and forms a sound space in front of the microphone unit 21.

Since the microphone unit 21 is pressed by the rib-shaped portion 12b of the front cover 12, the lead wire 31 which crosses the ring-shaped projection 42e on the bottom surface of the microphone bush 42 is pressed by the ring-shaped projection 42e.

As illustrated in FIG. 6, a gap T is formed between the bottom surface of the microphone element 41 and an inner bottom surface of the microphone bush 42. By adjusting the gap T, the force with which the ring-shaped projection 42e presses the lead wire 31 which crosses the ring-shaped projection 42e may be adjusted. That is, if the gap T is large, the force with which the ring-shaped projection 42e presses the lead wire 31 may be small and, if the gap T is small, the force with which the ring-shaped projection 42e presses the lead wire 31 may be large.

As described above, according to the present embodiment, it is possible to reduce vibration of the lead wire 31 drawn from the microphone bush 42 without any increase in the additional parts.

Second Embodiment

FIG. 7A is an exterior perspective view of a digital camera 110 which is an exemplary electronic device to which the present invention is applied.

As illustrated in FIG. 7A, a front side of the digital camera 110 is covered with a front cover 120 and a rear side of the digital camera 110 is covered with a rear cover 130. A lens unit 140 is disposed at the front side of the digital camera 110. A microphone hole 130a is formed in an upper surface of the rear cover 130. The microphone hole 130a is a through hole formed orthogonal to an optical axis of the lens unit 140.

FIG. 7B is a perspective view illustrating a state in which a front cover 120 and a rear cover 130 are removed from the digital camera 110.

As illustrated in FIG. 7B, a lens unit 140, a battery box 220, a stroboscopic light emission unit 150 and a top base 200 are disposed inside the digital camera 110. Operating members, such as a zoom ring and a release button, are disposed on the top base 200. A container portion 200a which contains a microphone unit 210 is formed in the top base 200. The microphone unit 210 is disposed immediately below the microphone hole 130a. The top base 200 functions as a main body member.

FIG. 8A is a perspective view illustrating a state in which a microphone unit 210 is being placed in a container portion 200a formed in a top base 200. When the microphone unit 210 is placed in the container portion 200a, the lead wire 310 is disposed in a slit 200b. An operation system board 320 on which, for example, a zoom switch and a release switch are mounted is attached to a rear side of the top base 200. The lead wire 310 is soldered to an operation system board 320.

FIG. 8B is a perspective view illustrating a state in which the microphone unit 210 is removed from the top base 200 illustrated in FIG. 8A.

As illustrated in FIG. 8B, the container portion 200a is formed to surround a side surface and a bottom surface of the microphone unit 210. The slit 200b is formed by removing a part of a side surface of the container portion 200a.

The microphone unit 210 includes a microphone element 410, the lead wire 310 and a microphone bush 420. The lead wire 310 is soldered to the microphone element 410 at one end thereof and is soldered to the operation system board 320 at the other end thereof. The microphone bush 420 is made of an elastic material, such as silicon rubber, and is formed in a shape to be attachable to the microphone element 410 to which one end of the lead wire 310 has been soldered. That is, the microphone unit 210 is a unit in which the lead wire 310 is soldered to the microphone element 410 and the microphone bush 420 is attached to the microphone element 410 to which the lead wire 310 has been soldered.

The microphone unit 210 is placed in the container portion 200a from an upper surface side of the top base 200 (i.e., a side of a surface which is to be covered with the rear cover 130).

FIGS. 9A to 9D are diagrams illustrating a procedure of assembling the microphone unit 210.

Figure 9A:
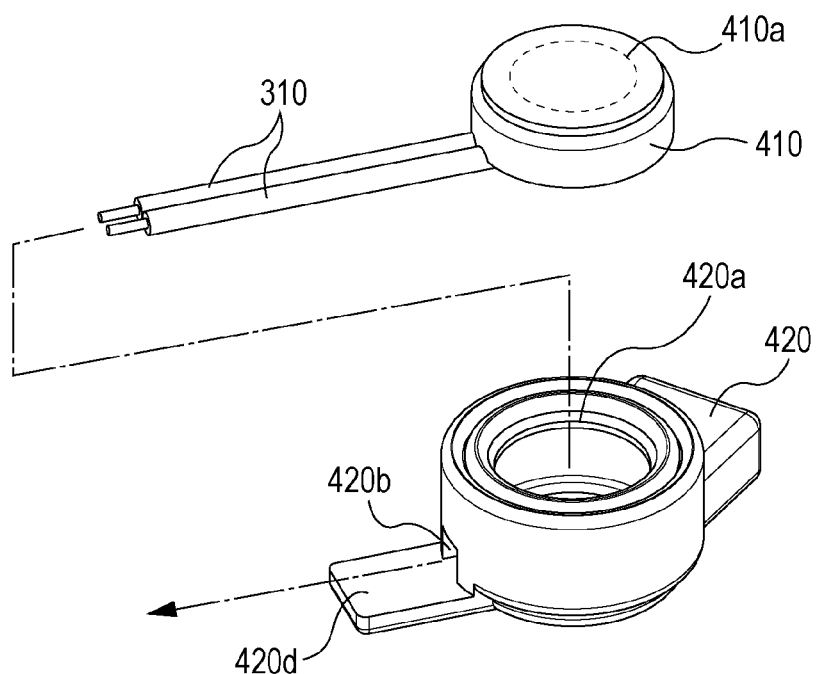
FIGS. 9A to 9D are diagrams illustrating a procedure of assembling the microphone unit.

FIG. 9A is a diagram illustrating a state in which the lead wire 310 has been soldered to the microphone element 410 and the microphone element 410 has not yet been attached to the microphone bush 420.

As illustrated in FIG. 9A, a sound-collecting portion 410a is formed in the microphone element 410. The microphone bush 420 includes an opening 420a through which the sound-collecting portion 410a is exposed when the microphone bush 420 is attached to the microphone element 410. The microphone bush 420 includes a first insertion hole 420b through which the lead wire 310 is inserted from the inside to the outside of the microphone bush 420 when the microphone bush 420 is attached to the microphone element 410. A tongue piece portion 420d is formed to extend horizontally at an end of the microphone bush 420 in which the first insertion hole 420b is formed. The thickness of the tongue piece portion 420d is determined such that the tongue piece portion 420d is foldable toward the microphone bush 420. Therefore, the tongue piece portion 420d may be folded toward the microphone bush 420 so as to cover the first insertion hole 420b.

Figure 9B:
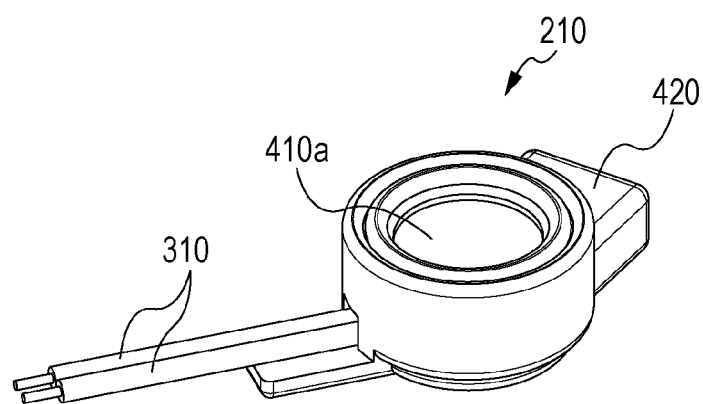

FIG. 9B is a diagram illustrating a state in which the microphone element 410 has been placed inside the microphone bush 420. Since the opening diameter of the opening 420a of the microphone bush 420 is smaller than the outer diameter of the microphone element 410, the opening 420a of the microphone bush 420 is expanded when the microphone element 410 is to be placed inside the microphone bush 420. When the microphone element 410 is attached to the microphone bush 420, the microphone element 410 is covered with the microphone bush 420 except for the sound-collecting portion 410a. The lead wire 310 is placed inside the microphone bush 420 through the opening 420a and is drawn through the first insertion hole 420b.

When the lead wire 310 is drawn through the first insertion hole 420b as illustrated in FIG. 9B, the lead wire 310 is drawn on an upper surface of the tongue piece portion 420d.

The dimension of the first insertion hole 420*b* is substantially equal to the cross-sectional area of the lead wire 310. If the dimension of the first insertion hole 420*b* is significantly larger than the cross-sectional area of the lead wire 310, the lead wire 310 moves freely in the first insertion hole 420*b*. Such a situation is not favorable. On the other hand, if the dimension of the first insertion hole 420*b* is significantly smaller than the cross-sectional area of the lead wire 310, insertion of the lead wire 310 is difficult.

Figure 9C:
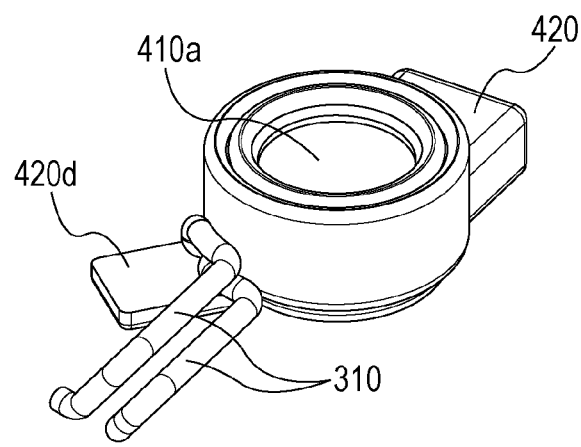

FIG. 9C is a diagram illustrating a state in which the lead wire 310 drawn on the upper surface of the tongue piece portion 420*d* is bent. As illustrated in FIG. 9C, the lead wire 310 drawn on the upper surface of the tongue piece portion 420*d* is bent along the side surface of the microphone bush 420. Then, the lead wire 310 is further bent so that the lead wire 310 may be disposed in the slit 200*b* formed in the top base 200. The position at which the lead wire 310 is bent to be disposed in the slit 200*b* is near an end of the tongue piece portion 420*d* which has been folded toward the microphone bush 420.

The microphone unit 210 is placed in the container portion 200*a* of the battery box 220 in the state illustrated in FIG. 9C.

Figure 9D:
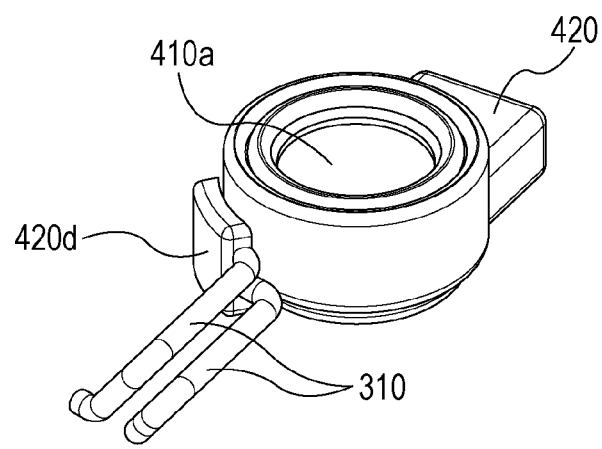

FIG. 9D is a diagram illustrating a state in which the tongue piece portion 420*d* has been folded toward the microphone bush 420. When the microphone unit 210 is placed completely in the container portion 200*a*, the microphone unit 210 is in the state illustrated in FIG. 9D.

Figure 10A:
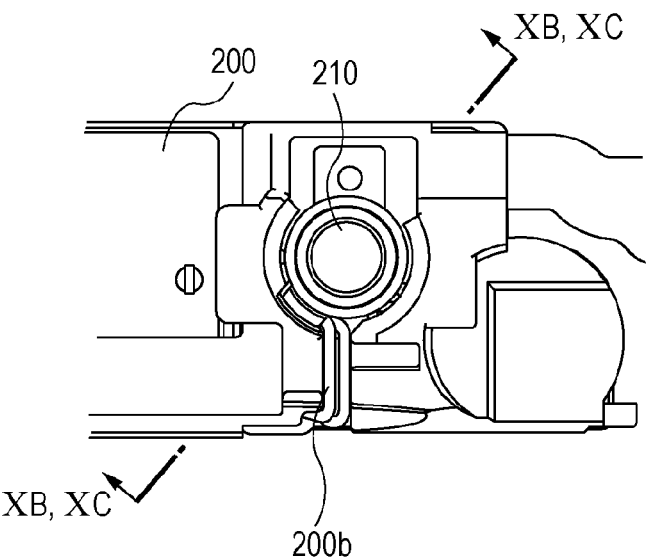
FIGS. 10A to 10C are diagrams illustrating a state in which the microphone unit is being placed in the container portion of the top base.

FIG. 10A is a diagram of the top base 200 seen from above. The microphone unit 210 is placed in the container portion 200*a* of the top base 200.

Figure 10B:
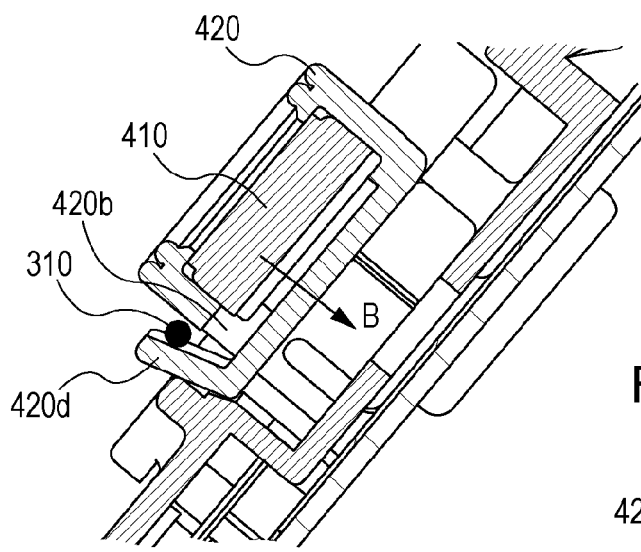
Figure 10C:
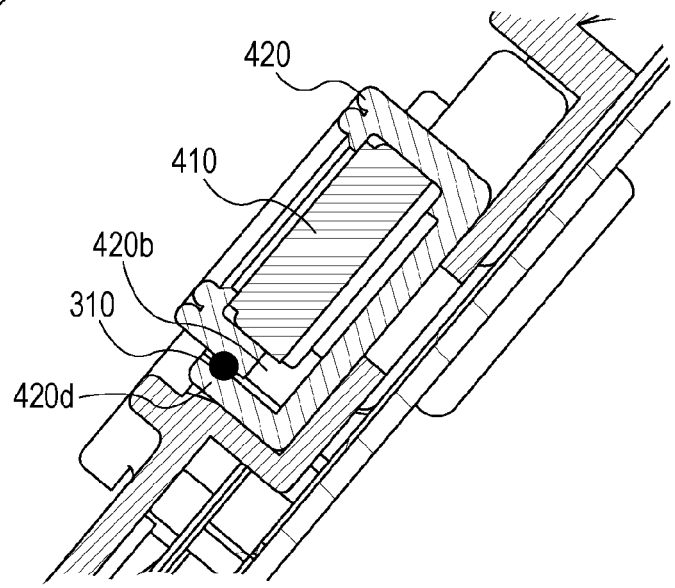

FIGS. 10B and 10C are diagrams each illustrating a state in which the microphone unit 210 assembled in the state of FIG. 9C is being placed in the container portion 200*a* of the top base 200. FIGS. 10B and 10C are cross sectional views along line XB-XB and line XC-XC of FIG. 10A, respectively.

As illustrated in FIG. 10A, when the microphone unit 210 is placed in the container portion 200*a* of the top base 200, the orientation of the microphone unit 210 is adjusted such that the lead wire 310 which has been bent near the end of the tongue piece portion 420*d* is situated above the slit 200*b*. When the microphone unit 210 is moved in the direction of arrow B from the state of FIG. 10B, the state of FIG. 10C is obtained.

When the microphone unit 210 begins to be placed in the container portion 200*a* of the top base 200 as illustrated in FIG. 10B, the tongue piece portion 420*d* of the microphone bush 420 is folded toward the microphone bush 420. The folded tongue piece portion 420*d* presses the lead wire 310 which has been bent along the side surface of the microphone bush 420. The lead wire 310 which has been bent along the side surface of the microphone bush 420 is disposed between the microphone bush 420 and the tongue piece portion 420*d*. With this configuration, vibration of the lead wire 310 is reduced. Further, since the tongue piece portion 420*d* of the microphone bush 420 is folded toward the microphone bush 420, the folded tongue piece portion 420*d* closes the first insertion hole 420*b* of the microphone bush 420. With this configuration, entrance of noise and vibration into the microphone bush 420 through the first insertion hole 420*b* can be reduced.

As described above, according to the present embodiment, it is possible to reduce vibration of the lead wire 310 drawn from the microphone bush 420 without any increase in the additional parts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. The scope of the following claims is to be accorded the broadest interpretation so as to encompass all such modifications and equivalent structures and functions.

This application claims the benefit of Japanese Patent Application No. 2012-022149, filed Feb. 3, 2012 which is hereby incorporated by reference herein in its entirety.

What is claimed is:

1. An electronic device, comprising:
a microphone which includes a lead wire;
a microphone bush which is made of an elastic material and is configured to be attached to the microphone; and
a main body member which includes a container portion configured to store the microphone to which the microphone bush is attached,
wherein a foldable tongue piece portion is formed to extend at an end of the microphone bush,
wherein an insertion hole in which the lead wire is inserted is formed near the tongue piece portion,
wherein when the microphone to which the microphone bush is attached is stored in the container portion, the tongue piece portion is folded, and
wherein the lead wire drawn through the insertion hole is pressed by folding the tongue piece portion.

2. The electronic device according to claim 1,
wherein the container portion includes a slit portion,
wherein when the microphone to which the microphone bush has been attached is stored in the container portion, the lead wire drawn through the insertion hole is disposed in the container portion, and
wherein the tongue piece portion is folded such that the lead wire drawn through the insertion hole is disposed within the tongue piece portion inside the slit portion by storing, in the container portion, the microphone to which the microphone bush has been attached.

3. The electronic device according to claim 1,
wherein the tongue piece portion is folded such that the tongue piece portion covers the insertion hole by storing, in the container portion, the microphone covered by the microphone bush.

4. An electronic device, comprising:
a microphone which includes a lead wire;
a microphone bush which is made of an elastic material and is configured to be attached to the microphone; and
a main body member which includes a container portion configured to store the microphone to which the microphone bush is attached,
wherein a foldable tongue piece portion is formed to extend at an end of the microphone bush,
wherein the microphone bush includes a first insertion hole and a second insertion hole,
wherein when the microphone bush is attached to the microphone, the lead wire is drawn from the inside of the microphone bush to the outside of the microphone bush through the first insertion hole,
wherein the lead wire drawn through the first insertion hole is inserted in the second insertion hole,
wherein the first insertion hole and the second insertion hole are formed independently from each other,
wherein the tongue piece portion extends from a position near the second insertion hole,
wherein when the microphone to which the microphone bush is attached is stored in the container portion, the tongue piece portion is folded, and wherein the lead wire drawn through the second insertion hole is pressed by folding the tongue piece portion.

5. The electronic device according to claim 4,
wherein a projection is formed on a bottom surface of the microphone bush, and
wherein when the microphone to which the microphone bush has been attached is stored in the container portion, the projection presses a part of the lead wire drawn through the first insertion hole and not inserted in the second insertion hole.

6. The electronic device according to claim 5,
wherein the first insertion hole is formed on a bottom surface of the microphone bush, and
wherein the second insertion hole is formed on the tongue piece portion.

* * * * *